(12) United States Patent
Morioka

(10) Patent No.: US 7,797,380 B2
(45) Date of Patent: Sep. 14, 2010

(54) CONTENT TRANSMISSION APPARATUS, CONTENT RECEPTION APPARATUS, AND CONTENT UPLOAD METHOD

(75) Inventor: Yasuhiro Morioka, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 19 days.

(21) Appl. No.: 12/391,550

(22) Filed: Feb. 24, 2009

(65) Prior Publication Data

US 2009/0292804 A1 Nov. 26, 2009

(30) Foreign Application Priority Data

May 26, 2008 (JP) .............................. 2008-137177

(51) Int. Cl.
*G06F 15/16* (2006.01)
*H04N 7/173* (2006.01)
(52) U.S. Cl. ..................... 709/203; 709/208; 709/211; 725/115
(58) Field of Classification Search .................. None
See application file for complete search history.

(56) References Cited

U.S. PATENT DOCUMENTS

| 2005/0210501 A1 | 9/2005 | Zigmond et al. |
| 2005/0229225 A1 | 10/2005 | Klausberger et al. |

FOREIGN PATENT DOCUMENTS

| JP | 10-136318 | 5/1998 |
| JP | 2003-209523 | 7/2003 |
| JP | 2005-4648 | 1/2005 |
| JP | 2005-229509 | 8/2005 |
| JP | 2006-005700 | 1/2006 |
| JP | 2007-158854 | 6/2007 |
| JP | 2007-295609 | 11/2007 |
| JP | 2008-60959 | 3/2008 |
| JP | 2008-109334 | 5/2008 |
| JP | 2008-118410 | 5/2008 |
| JP | 2008-199436 | 8/2008 |

OTHER PUBLICATIONS

"Contentdirectory:1 Service Template Version 1.01", For UPnP™ Version 1.0, Standardized DCP, pp. 1-89, (2002).
ContentDirectory: 1 Service Template Version 1.01, Contributing Members of the UPnP™ Forum (1999-2002) ( 7 pages).

*Primary Examiner*—Hassan Phillips
(74) *Attorney, Agent, or Firm*—Finnegan, Henderson, Farabow, Garrett & Dunner, L.L.P.

(57) ABSTRACT

According to one embodiment, a content transmission apparatus includes a data acquisition module configured to get a content item and metadata having a plurality of items for explaining details of the content, a notification module configured to notify an upload destination apparatus for the content of the metadata, a transmission module configured to encode the content and transmits the encoded content as a body of an upload request based on an HTTP POST request to an entry point created by a content reception apparatus on the basis of the metadata, a detection module configured to detect a change in metadata notified to the content reception apparatus relative to metadata newly got by the data acquisition module, and a posterior notification module configured to notify the content reception apparatus of posterior metadata containing at least a changed item in the metadata, when the detection module detects a change in the metadata.

18 Claims, 14 Drawing Sheets

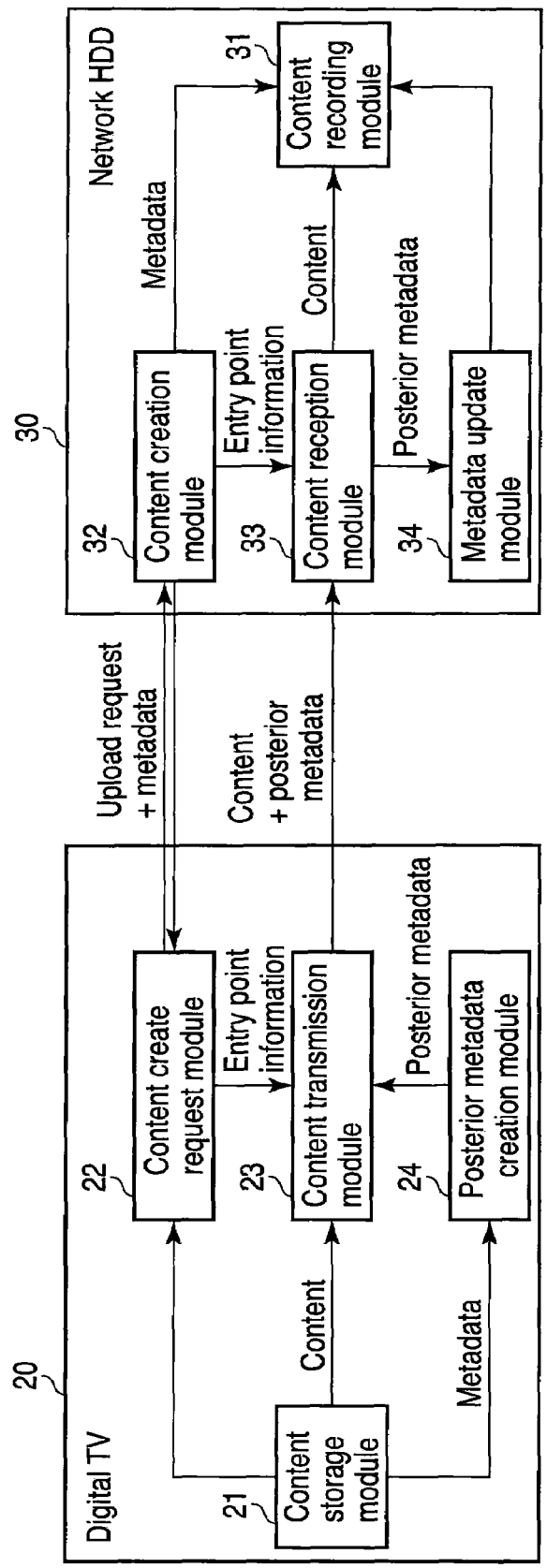
F I G. 2

```
request: CreateObject("10",
"<DIDL-Lite xmlns:dc="http://purl.org/dc/elements/1.1/"
    xmlns:upnp="urn:schemas-upnp-org:metadata-1-0/upnp/"
    xmlns="urn:schemas-upnp-org:metadata-1-0/DIDL-Lite">
  <item id="" parentID="10" restricted="0">
    <dc:title>A Newsshow </dc:title>
    <upnp:class>object.item.videoItem </upnp:class>
    <upnp:scheduledStartTime>2008-02-28T19:00:00</upnp:scheduledStartTime>
    <upnp:scheduledEndTime>2008-02-28T19:30:00</upnp:scheduledEndTime>
    <upnp:genre>news</upnp:genre>
  </item>
</DIDL-Lite>")
response: CreateObject("12",
"<DIDL-Lite xmlns:dc="http://purl.org/dc/elements/1.1/"
    xmlns:upnp="urn:schemas-upnp-org:metadata-1-0/upnp/"
    xmlns="urn:schemas-upnp-org:metadata-1-0/DIDL-Lite/">
  <item id="12" parentID="10" restricted="0">
    <dc:title>A Newsshow </dc:title>
    <res importUri="http:/pc/item?id=12" protocolInfo="*:*:video/*:*">
    </res>
    <upnp:class>object.item.videoItem</upnp:class>
    <upnp:scheduledStartTime>2008-02-28T19:00:00</upnp:scheduledStartTime>
    <upnp:scheduledEndTime>2008-02-28T19:30:00</upnp:scheudledEndTime>
    <upnp:genre>news</upnp:genre>
  </item>
</DIDL-Lite>")
```

F I G. 4

```
request:POST http:/pc/item?id=12 HTTP/1.1
ContentType: video/mpeg
Transfer-Encoding: chunked
Trailer: X-UpdatedMetadata
(Chunked data length)
(Chunked - encoded content)
...
...(Repetition)...
...
0
(End of content)

X-UpdatedMetadata: <dc:title>A Special
Newshow</dc:title><upnp:scheduledEndTime>2008-02-29T19:45:00</upnp:scheduledEndTime/> response:HTTP/1.1 200 OK
```

F I G. 5

```
request: Browse("12", BrowseMetatada, *, , 0, 1, )

response: Browse(
"<DIDL-Lite xmlns:dc="http://purl.org/dc/elements/1.1/"
    xmlns:upnp="urn:schemas-upnp-org:metadata-1-0/upnp/"
    xmlns="urn:schemas-upnp-org:metadata-1-0/DIDL-Lite/">
  <item id="12" parentID="10" restricted="0">
    <dc:title>A Special Newsshow </dc:title>
    <res protocolInfo="http-get:*:video/mpeg:*"/>
      http://pc/cd/content?id=12
    </res>
    <upnp:class>object.item.videoItem</upnp:class>
    <upnp:scheduledStartTime>2008-02-28T19:00:00</upnp:scheduledStartTime>
    <upnp:scheduledEndTime>2008-02-29T19:45:00</upnp:scheudledEndTime>
    <upnp:genre>news</upnp:genre>
  </item>
</DIDL-Lite>", 1, 1, 10)
```

F I G. 6

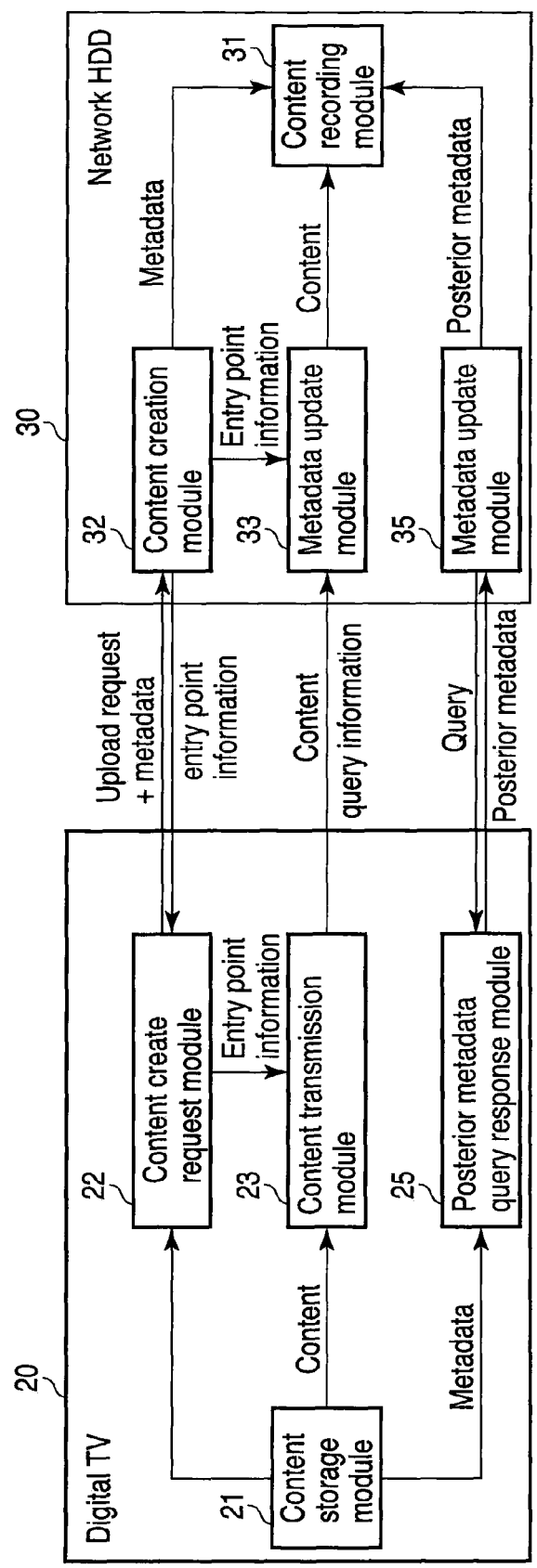
F I G. 7

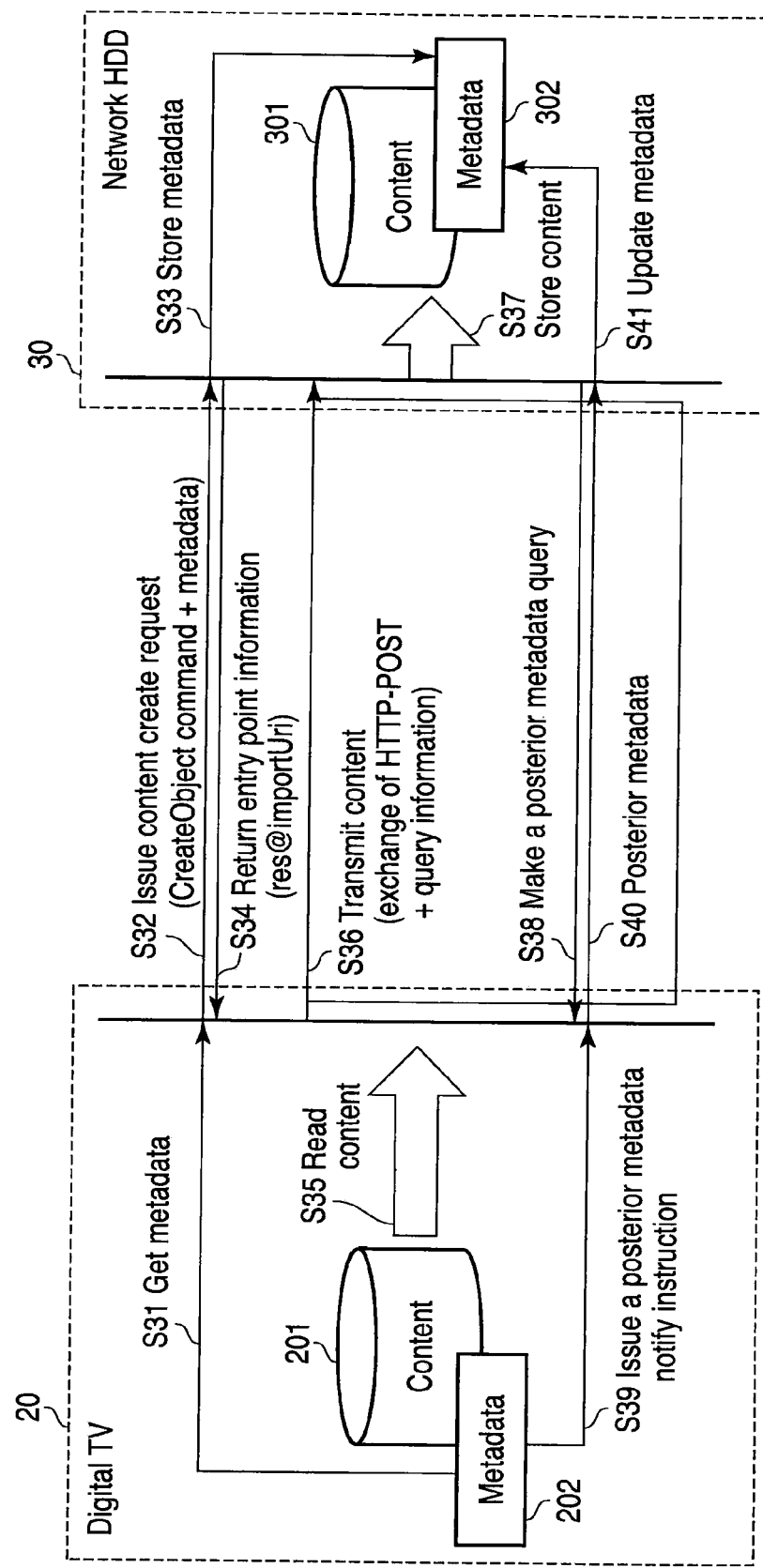
F I G. 8

```
request:POST http:/pc/item?id=12 HTTP/1.1
ContentType: video/mpeg
X-MetadataQueryURL: http://tuner/item?source=1234abcd5678
(Encoded content)
..
..
response:HTTP/1.1 200 OK
```

FIG. 9

```
request:GET http://tuner/item?source=1234abcd5678 HTTP/1.1 response:HTTP/1.1 200 OKContentType: text/html
   <updated>
      <dc:title>A Special Newshor</dc:title>
      <upnp:scheduledEndTime>2008-02-28T19:45:00</upnp:scheduledEndTime>
   </updated>
```

FIG. 10

```
request:POST http:/pc/item?id=12 HTTP/1.1
ContentType: video/mpeg
X-MetadataQueryURL: {uuid:
550e8400-e29b-41d4-a716-446655440000}{urn:schemas-upnp-org:serviceId:ContentDirectory:1}{/tuner/ch3}
(Encoded content)
    :    :
response:HTTP/1.1 200 OK
```

FIG.11

```
request: Browse("/tuner/ch3", BrowseMetatada, *, , 0, 1, ,)

response: Browse(
"<DIDL-Lite xmlns:dc="http://purl.org/dc/elements/1.1/"
    xmlns:upnp="urn:schemas-upnp-org:metadata-1-0/upnp/"
    xmlns="urn:schemas-upnp-org:metadata-1-0/DIDL-Lite/">
  <item id="/tuner/ch3" parentID="/tuner" restricted="1">
    <dc:title>A Special Newsshow </dc:title>
    <res protocolInfo="http-get:*:video/mpeg:*"/>
        http://tuner/cd/content?id=tuner_ch3
    </res>
    <upnp:channelNr>3</upnp:channelNr>
    <upnp:channelName>NumberThree channel</upnp:channelName>
    <upnp:class>object.item.videoItem.videoBroadcast</upnp:class>
    <upnp:scheduledStartTime>2008-02-28T19:00:00</upnp:scheduledStartTime>
    <upnp:scheduledEndTime>2008-02-29T19:45:00</upnp:scheudledEndTime>
    <upnp:genre>news</upnp:genre>
  </item>
</DIDL-Lite>", 1, 1, 30)
```

FIG. 12

```
request: UpdateObject ("12",
"<dc:title>A Newsshow</dc:title>,
  <upnp:scheduledEndTime>2008-02-28T19:00:00</upnp:scheduledEndTime>",
"<dc:title>A Special Newsshow</dc:title>,
  <upnp:scheduledEndTime>2008-02-28T19:45:00</upnp:scheduledEndTime>")

response: (Success)
```

FIG. 15

CONTENT TRANSMISSION APPARATUS, CONTENT RECEPTION APPARATUS, AND CONTENT UPLOAD METHOD

CROSS-REFERENCE TO RELATED APPLICATIONS

This application is based upon and claims the benefit of priority from Japanese Patent Application No. 2008-137177, filed May 26, 2008, the entire contents of which are incorporated herein by reference.

BACKGROUND

1. Field

One embodiment of the invention relates to a content transmission apparatus, content reception apparatus, and content upload method which transmit contents via a network.

2. Description of the Related Art

Digital Living Network Alliance (DLNA) Guideline Ver. 1.5 has been laid down with the aim of connecting electronic devices in homes via a network.

A technique designed to transmit contents via a network is also disclosed (see UPnP AV ContentDirectory:1, Jun. 25, 2002, Section 2.7.6 "CreateObject", 2.7.8 "UpdateObject", 2.8.7 "Object Creation", 2.8.8.5 "Transfer using direct HTTP::POST").

Content uploading based on DLNA guide line 1.5 takes a two-step sequence:

1) An upload source apparatus presents an upload destination apparatus metadata for explaining the details of a content item (CreateObject command of UPnP AV), and the upload destination apparatus creates an entry point for uploading, and 2) The upload source apparatus uploads a content item to the entry point in the upload destination apparatus (transmission by HTTP POST).

In this sequence, the metadata presented by the upload source apparatus to the upload destination apparatus before content uploading may be unknown at the start of uploading or may change during uploading as in the case of recording of a broadcast stream due to the update of the program information or insertion of a breaking news. If the metadata changes after the start of uploading in the upload source apparatus, the upload destination apparatus is not able to know the new metadata.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 2 is an exemplary block diagram showing the system configuration of the content transmission apparatus and content reception apparatus according to the first embodiment;

FIG. 4 is an exemplary view showing an example of a content create request and entry point information which are transmitted by using a CreateObject command conforming to ContentDirectory:1 service specifications according to the first embodiment;

FIG. 5 is an exemplary view showing an example of a case in which a content item is transmitted by using an HTTP POST command according to the first embodiment;

FIG. 6 is an exemplary view showing an example of the transmission of a Browse command according to the first embodiment;

FIG. 7 is an exemplary block diagram showing the system configuration of a content transmission apparatus and content reception apparatus according to the second embodiment;

FIG. 8 is an exemplary sequence chart showing a content upload sequence according to the second embodiment;

FIG. 9 is an exemplary view showing an example of a case in which a content item is transmitted by using an HTTP POST command according to the second embodiment;

FIG. 10 is an exemplary view showing an example in which a content reception apparatus gets posterior metadata by issuing an HTTP GET request to the query URL of a content transmission apparatus according to the second embodiment;

FIG. 11 is an exemplary view showing an example in which a combination of the equipment identifier, service identifier, and channel identifier of the content transmission apparatus is transmitted as query information for the metadata of a content item to the content reception apparatus according to a modification of the second embodiment;

FIG. 12 is an exemplary view showing an example of the transmission of a Browse command according to the modification of the second embodiment;

FIG. 15 is an exemplary view showing an example of a message used by the content reception apparatus to issue a metadata update request to the content transmission apparatus.

DETAILED DESCRIPTION

Various embodiments according to the invention will be described hereinafter with reference to the accompanying drawings. In general, according to one embodiment of the invention, a content transmission apparatus comprises an data acquisition module configured to get a content item and metadata having a plurality of items for explaining details of the content, a notification module configured to notify an upload destination apparatus for the content of the metadata via a network, a transmission module configured to encode the content and transmits, via the network, the encoded content as a body of an upload request based on an HTTP POST request to an entry point created by a content reception apparatus on the basis of the metadata, a detection module configured to detect a change in metadata notified to the content reception apparatus relative to metadata newly got by the data acquisition module, and a posterior metadata notification module configured to notify the content reception apparatus of posterior metadata containing at least a changed item in the metadata via the network, when the detection module detects a change in metadata.

The embodiments of the present invention will be described below with reference to the views of the accompanying drawing.

First Embodiment

Figure 1:
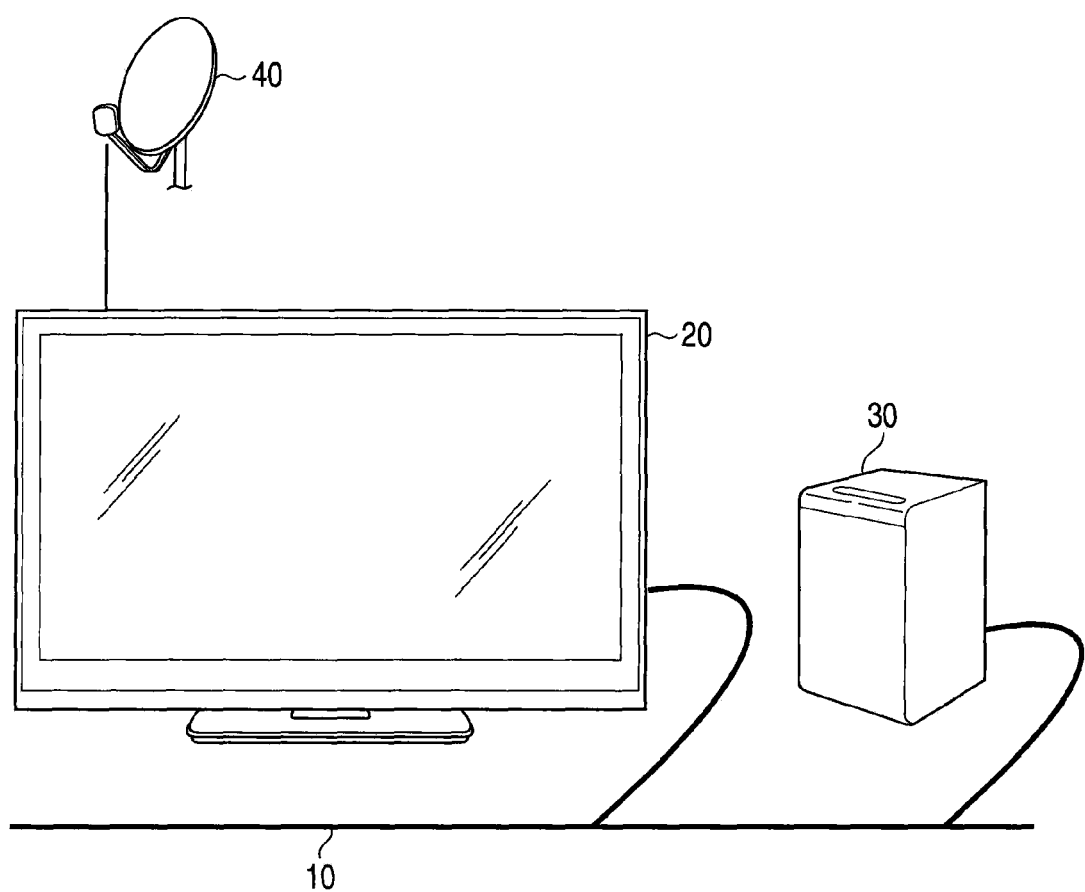
FIG. 1 is an exemplary block diagram showing a content transmission apparatus and content reception apparatus according to the first embodiment.

FIG. 1 is a view showing a content transmission apparatus and content reception apparatus according to the first embodiment of the present invention. This content transmission apparatus is implemented as a digital TV 20. The content reception apparatus is implemented as a network HDD 30 which operates as network-attached storage (NAS).

The digital TV 20 includes a tuner which receives a digital broadcast wave from an antenna 40 and demodulates the broadcast wave. The digital TV 20 displays a video based on the content obtained by demodulation and outputs sound based on the content.

The digital TV 20 based on the content upload sequence of DLNA guideline 1.5 operates as a UPnP AV ContentDirectory client and an HTTP client. The network HDD 30 operates as a UPnP AV ContentDirectory service and an HTTP server. The digital TV 20 is connected to the network HDD 30 via a network 10. The network HDD 30 can store the data of the content demodulated by the tuner of the digital TV 20. The digital TV 20 can find and identify the network HDD 30 on the basis of, for example, a UPnP device discovery sequence.

The digital TV 20 and the network HDD 30 transmit and store contents on the basis of the content upload sequence based on DLNA guideline 1.5.

FIG. 2 is a block diagram showing the system configuration of the digital TV 20 and network HDD 30 according to the first embodiment of the present invention. The digital TV 20 includes a content storage module 21 which stores a content item to be uploaded, a content create request module 22 which gets metadata from a content item and informs the network HDD 30 of the start of an upload sequence, a posterior metadata creation module 24 which gets a change in metadata during uploading and informs a content transmission module 23 of the change, the content transmission module 23 which transmits a content item to the network HDD 30 and finally transmits the changes of the metadata informed by the posterior metadata creation module 24, and the like. Not only a storage unit but also a tuner unit can be a content storage module 21.

The network HDD 30 includes a content creation module 32 which creates an entry point for a content item to be uploaded on the basis of the metadata sent from the content create request module 22 of the digital TV 20, a content reception module 33 which receives the content data sent from the content transmission module 23 of the digital TV 20 and records it in a content recording module 31, the content recording module 31 which records and manages content data and metadata, and a metadata update module 34 which get the posterior metadata postposed in a received content and updates the metadata in the content recording module 31.

Figure 3:
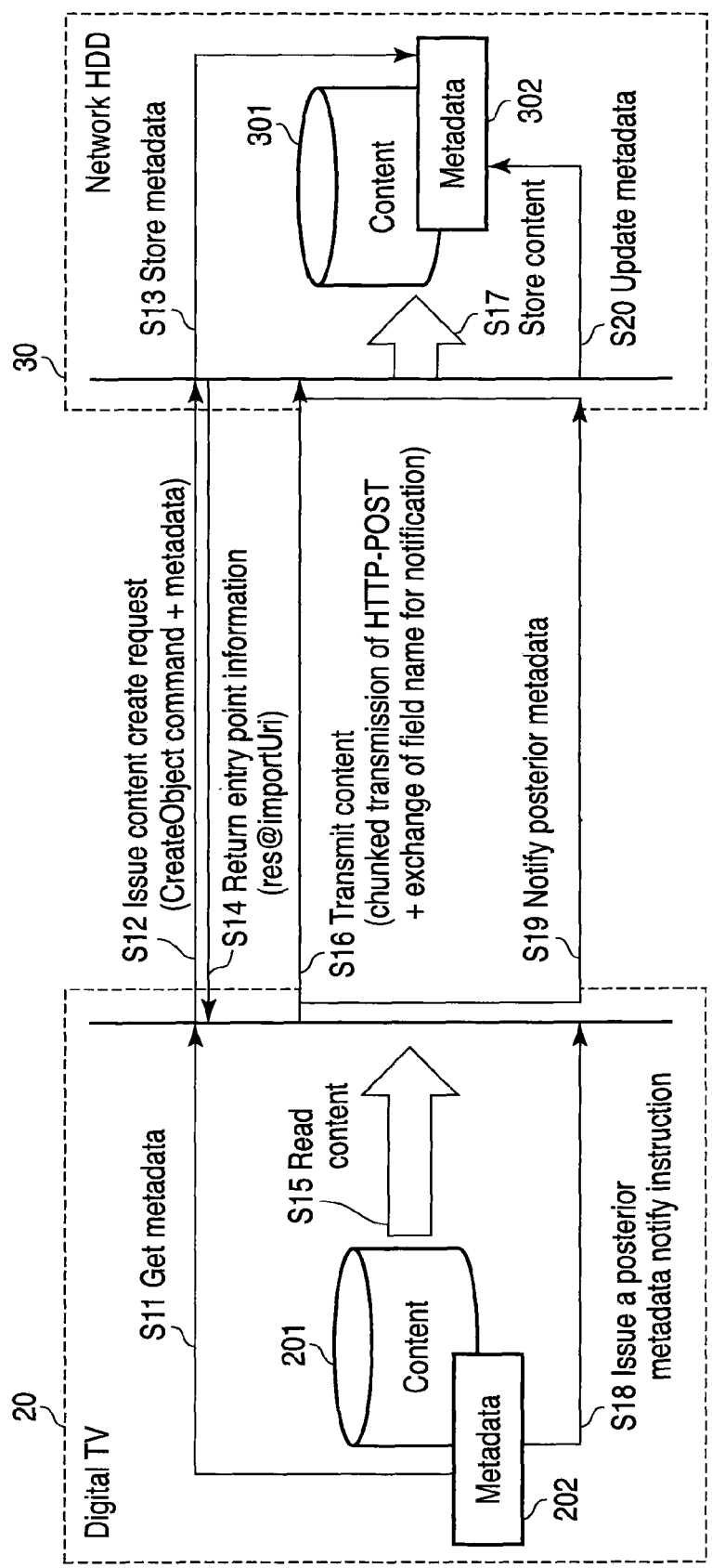
FIG. 3 is an exemplary sequence chart showing a content upload sequence according to the first embodiment.

A content upload sequence according to the first embodiment of the present invention will be described with reference to the sequence chart of FIG. 3. FIG. 3 is a sequence chart showing a content upload sequence according to the first embodiment of the present invention.

First of all, the content create request module 22 of the digital TV 20 gets, from the content storage module 21, metadata 202 of a content item 201 to be uploaded (block S11), and sends a content create request to the content creation module 32 of the network HDD 30 (block S12). The content creation module 32 of the network HDD 30 stores received metadata 302 in the content recording module 31 (block S13). The content creation module 32 creates an entry point for a content item to be uploaded on the basis of the metadata 302, and returns entry point information corresponding to the created content to the digital TV 20 (block S14).

FIG. 4 shows an example of a content create request and entry point information which are transmitted by using a CreateObject command conforming to ContentDirectory:1 service specifications. In this case, "request" is a content create request, and "response" indicates entry point information as a response to the request. In this "request", metadata is written by XML. This content create request requests to create an entry for a video content with the title being "A Newsshow", the start time being Feb. 28, 2008, 19:00, and the end time being Feb. 28, 2008, 19:30.

"Response" indicates that the identifier of the content created in addition to the content information of the sent metadata is "12", and the upload destination of the content is URL "http:/pc/item?id=12" indicated by the importUri attribute of the res tag.

Subsequently, the content transmission module 23 of the digital TV 20 reads the content 201 from the content storage module 21 (block S15), and transmits the content to the content reception module 33 of the network HDD 30 (block S16). The content 201 is read altogether or is read portion by portion as in the case of a broadcast content or the like and sent gradually. The content reception module 33 of the network HDD 30 receives a sent content 301, and stores it in an area associated with the metadata 302 of the content recording module 31 (block S17).

During the transmission of the content, the posterior metadata creation module 24 monitors a change in the metadata 202 of the content. Upon detecting a change, the posterior metadata creation module 24 creates a posterior metadata containing at least a changed item in the metadata, and instructs the content transmission module 23 to postpose the posterior metadata at the end of the transmission of the content (block S18). The content transmission module 23 attaches the posterior metadata to the end of the transmission of the content and transmits the resultant data to the content reception module 33 of the network HDD 30 (block S19). The metadata update module 34 of the network HDD 30 extracts posterior metadata from the data received by the content reception module 33, and updates the corresponding metadata 302 in the content recording module 31 (block S20).

FIG. 5 shows a case in which a content item is transmitted by using an HTTP POST command. In this case, a video content item in the MPEG format is transmitted to URL "http://pc/item?id=12", and a success or failure is returned as a response on the reception side. In this case, URL "http://pc/item?id=12" used as a destination is a value obtained as part of the successful response to the content create request. In this embodiment of the present invention, a content item is transmitted as the body of a POST message upon being chunked-encoded. Chunked encoding is characterized by being capable of transmitting a content item as a series of small portions instead of transmitting the content item altogether. According to the Hypertext Transfer Protocol (HTTP) specifications, when chunked-transfer is to be used, since a header field can be postposed in a body using a Trailer field, posterior metadata is placed in the postposed header field. In this case, X-UpdateMetadata is used as a header field to be used to notify posterior metadata. The corresponding header field name is designated in a Trailer field at the start of transmission to indicate to the reception side that the field is used for the above purpose. After the end of the transmission of the content, the posterior metadata placed in the X-UpdateMetadata field informs the network HDD 30 that the new title is "A Special Newsshow", and the new end time is Feb. 28, 2008, 19:45.

After the completion of uploading, the content in the network HDD 30 can be checked from the digital TV 20 by using a UPnP AV Browse command. After posterior metadata is transferred and the metadata in the content recording module 31 is updated in the above sequence, the content information of the metadata indicated by a response to a query is the content information updated by the posterior metadata. FIG. 6 shows an example of the transmission of a Browse command. A response ("Response") to the transmission of the Browse command indicates that the title is changed to "A Special Newsshow", and the end time is changed to Feb. 28, 2008, 19:45.

In the above series of operations in the upload sequence, the number of messages to be exchanged between the digital TV 20 and the network HDD 30 remains the same as that in the prior art.

Second Embodiment

FIG. 7 is a block diagram showing the arrangement of a content upload system including a digital TV 20 and a network HDD 30 according to the second embodiment of the present invention.

The digital TV 20 includes a content storage module 21 which stores a content item to be uploaded, a content create request module 22 which gets metadata from a content item and informs the network HDD 30 of the start of an upload sequence, a posterior metadata query response module 25 which gets a metadata change during uploading and responds to a query from a metadata update module 34 of the network HDD 30, and a content transmission module 23 which transmits a content item to the network HDD 30.

The network HDD 30 includes a content creation module 32 which creates an entry point for a content item to be uploaded on the basis of the metadata sent from the content create request module 22 of the digital TV 20, a content reception module 33 which receives the content data sent from the content transmission module 23 of the digital TV 20 and records it in a content recording module 31, the content recording module 31 which records and manages content data and metadata, and a metadata update module 35 which updates the metadata in the content recording module 31 upon getting posterior metadata by making a query about metadata to the posterior metadata query response module 25 of the digital TV 20.

The digital TV 20 and the network HDD 30 operate on the basis of the content upload sequence of DLNA guide line 1.5 as in the first embodiment.

A content upload sequence according to the second embodiment of the present invention will be described with reference to the sequence chart of FIG. 8. FIG. 8 is a sequence chart showing a content upload sequence according to the second embodiment of the present invention.

First of all, the content create request module 22 of the digital TV 20 gets metadata 202 of a content item 201 to be uploaded from the content storage module 21 (block S31), and sends a content create request to the content creation module 32 of the network HDD 30 (block S32). The content creation module 32 of the network HDD 30 stores received metadata 302 in the content recording module 31 (block S33). The content creation module 32 creates an entry point for a content item to be uploaded on the basis of the metadata 302, and returns entry point information corresponding to the created content item to the digital TV 20 (block S34). The processing up to this block is the same as that from block S11 to block S14 described in the first embodiment with reference to FIG. 3.

Subsequently, the content transmission module 23 of the digital TV 20 transmits a content item to the content reception module 33 of the network HDD 30 (block S36) while reading the content item from the content storage module 21 (block S35). A content item is read altogether or is read portion by portion as in the case of a broadcast content item or the like and sent gradually. In this case, the digital TV 20 sends the content item to the network HDD 30 upon attaching query information to the content item. The query information is a URL to which the posterior metadata of the content is to be returned.

Upon receiving the sent content, the content reception module 33 of the network HDD 30 stores the content in an area associated with the metadata in the content recording module 31 (block S37).

The posterior metadata query response module 25 detects, during transmission of a content item, whether the metadata of the content item has changed. Upon detecting a change, the posterior metadata query response module 25 creates posterior metadata containing at least a changed item in the metadata. In response to a query from the metadata update module 35 of the network HDD 30 (block S38), the posterior metadata query response module 25 returns the posterior metadata upon detection of a change (block S39). The metadata update module 35 of the network HDD 30 updates the corresponding content metadata in the content recording module 31 on the basis of the got posterior metadata (block S40).

FIG. 9 is a view showing an example of a case in which a content item is transmitted by using an HTTP POST command. In this case, a video content item in the MPEG format is transmitted to URL "http://pc/item?id=12", and a success is returned as a response on the reception side. In this case, URL "http://pc/item?id=12" used as a destination is a value obtained as part of the response to the content create request. In this embodiment, the posterior metadata URL as query information is http://tuner/item?source=1234abcd5678 given by an X-MetadataqueryURL field.

During uploading, the network HDD 30 makes a query about posterior metadata to the digital TV 20, and updates the metadata in the content recording module 31 on the basis of the got posterior metadata. The network HDD 30 makes such a query at least at the end of reception of content data. The network HDD 30 determines other query timings.

FIG. 10 shows an example in which the network HDD 30 gets posterior metadata by issuing an HTTP GET request to the query URL of the digital TV 20. In this case, the updated metadata is about a title and an end time, and indicates that the title is "A special Newsshow", and the end time is Feb. 29, 2008, 19:45. Note that it suffices to return all the metadata associated with the content instead of only a changed portion.

After the completion of uploading, the content in the network HDD 30 can be checked from the digital TV 20 by using a UPnP AV Browse command. This sequence and an example of content information are the same as those in the first embodiment.

In the above series of operations in the upload sequence, the network HDD 30 can get posterior metadata and update metadata for a recorded content even when uploading of a content item is interrupted from the network HDD 30 side. Note, however, that the digital TV 20 needs to also operate as a server apparatus which responds to a query as well as operating as a client apparatus. The network HDD 30 also needs to operate as a client apparatus which makes a query as well as operating as a server apparatus.

Modification of Second Embodiment

Assume that the digital TV 20 operates as a network tuner apparatus based on the DLNA guide line 1.5 specifications and provides another apparatus with a list of channels and a download service of a content item from one of the channels through ContentDirectory:1 service by the digital TV 20. In this case, it suffices to provide the network HDD 30 with the corresponding service identifier and channel identifier as query information for posterior metadata. The channel list discloses the title, category, start time/end time, and the like of a program on the air in addition to static channel information, as needed, to allow the network HDD 30 to check content information, as needed, by getting channel information of the network tuner apparatus on the basis of a channel identifier.

For example, as shown in FIG. 11, when starting to transmit a content item, the digital TV 20 as a content transmission apparatus transfers, to the network HDD 30, a combination of the equipment identifier (uuid: 550e8400-e29b-41d4-a716-446655440000) and service identifier (urn:schemas-upnp-org:serviceId:ContentDirectory:1) of the digital TV 20 and a channel identifier (/tuner/ch3) by using X-MetadataQueryURL.

The metadata update module of the network HDD 30 makes a query about posterior metadata by using, for example, a Browse command of ContentDirectory:1 service on the basis of query information. The obtained posterior metadata does not directly indicate a content item to be uploaded but is information about a channel which broadcasts the content. The network HDD 30 therefore needs to select and get necessary metadata from the posterior metadata. The case shown in FIG. 12 indicates that a channel having "/tuner/ch3" as a metadata identifier allows to obtain a content item in the MPEG video format with the channel number being "3", the channel name being "NumberThree Channel", the name of the program on the air being "A Special Newsshow", the start time being Feb. 28, 2008, 19:00, and the end time being 19:45, by using an HTTP GET request for "http//tuner/cd/content?id=tuner_ch3".

Third Embodiment

Figure 13:
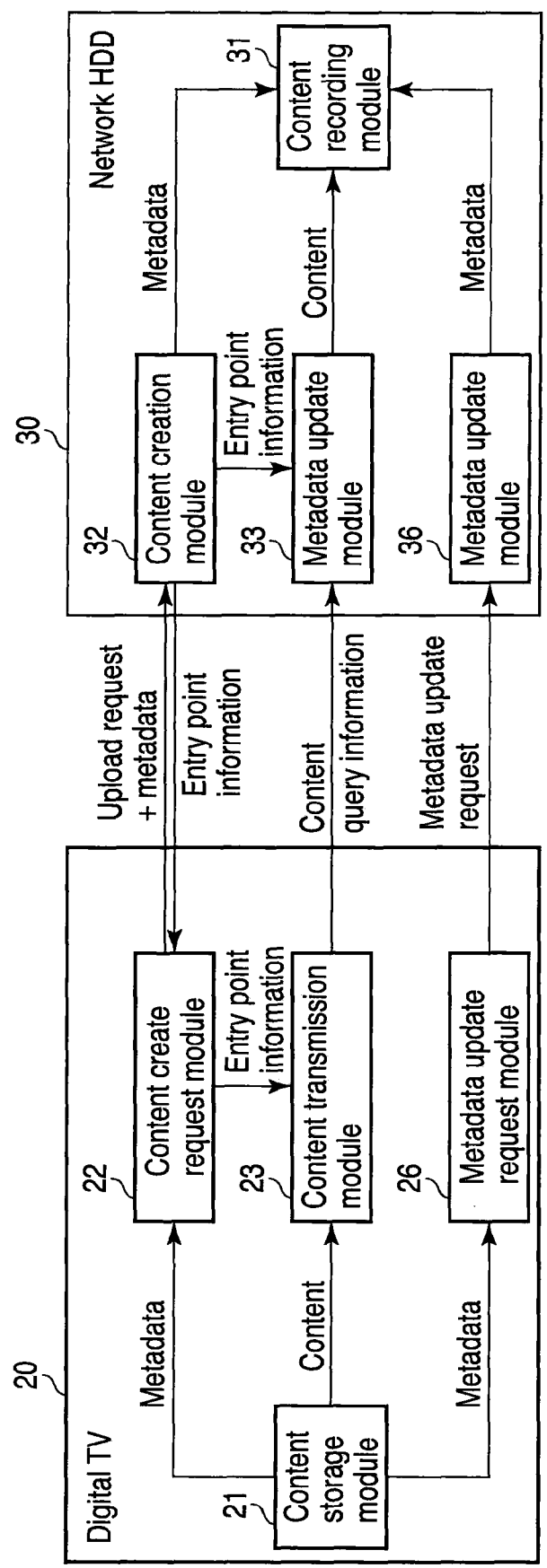
FIG. 13 is an exemplary block diagram showing the system configuration of a content transmission apparatus and content reception apparatus according to the third embodiment.

FIG. 13 shows the arrangement of a content upload system including a digital TV 20 and a network HDD 30 according to the third embodiment of the present invention. The digital TV 20 includes a content storage module 21 which stores a content item to be uploaded, a content create request module 22 which gets metadata from a content item and informs the network HDD 30 of the start of an upload sequence, a metadata update request module 26 which gets a metadata change during uploading and transmits a metadata update request to a metadata update module 36 of the network HDD 30, and a content transmission module 23 which transmits a content item to the network HDD 30.

The network HDD 30 includes a content creation module 32 which creates an entry point for a content item to be uploaded on the basis of the metadata sent from the content create request module 22 of the digital TV 20, a content reception module 33 which receives the content data sent from the content transmission module 23 of the digital TV 20 and records it in a content recording module 31, the content recording module 31 which records and manages content data and metadata, and a metadata update module 36 which receives a posterior metadata update request from the digital TV 20 and updates the metadata in the content recording module 31 on the basis of the details of the request.

As in the first and second embodiments, the digital TV 20 and the network HDD 30 operate on the basis of the content upload sequence of DLNA guide line 1.5.

Figure 14:
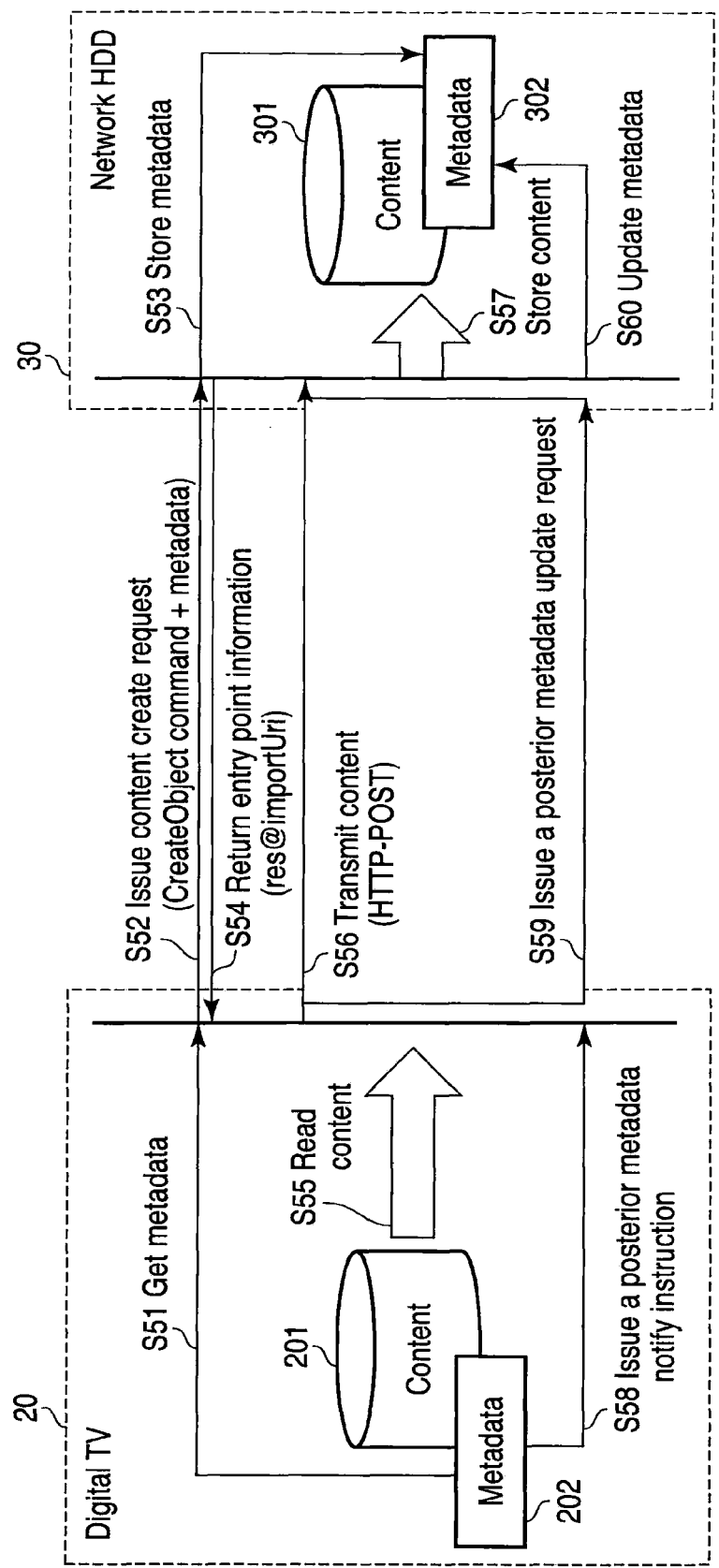
FIG. 14 is an exemplary sequence chart showing a content upload sequence according to the third embodiment.

A content upload sequence according to the third embodiment of the present invention will be described with reference to FIG. 14. FIG. 14 is a sequence chart showing a content upload sequence according to the third embodiment of the present invention.

First of all, the content create request module 22 of the digital TV 20 gets metadata 202 of a content item 201 to be uploaded from the content storage module 21 (block S51), and sends a content create request to the content creation module 32 of the network HDD 30 (block S52). The content creation module 32 of the network HDD 30 stores received metadata 302 in the content recording module 31 (block S53). The content creation module 32 creates an entry point for a content item to be uploaded on the basis of the metadata 302 and returns entry point information corresponding to the created content to the digital TV 20 (block S54). The processing up to this block is the same as that from block S11 to block S14 described in the first embodiment with reference to FIG. 3.

The metadata update request module 26 of the digital TV 20 monitors a change in content metadata during uploading of a content item, and creates posterior metadata containing at least a changed item in the metadata every time a change is detected. The metadata update request module 26 then issues a metadata update request to the metadata update module 36 of the network HDD 30 by using an UpdateObject command of ContentDirectory:1 (block S59). The metadata update module 36 of the network HDD 30 gets the posterior metadata designated by the UpdateObject command of ContentDirectory:1, and changes metadata corresponding to the content recorded in the content recording module 31 on the basis of the details of the metadata (block S60).

FIG. 15 shows an example of a message used by the network HDD 30 to issue a metadata update request to the digital TV 20. This message indicates that the UpdateObject command of ContentDirectory:1 service is used to issue a request to change the metadata of a content item created by the network HDD 30 with the value of the content identifier being "12" so as to change the title to "A Special Newsshow" and the end time to Feb. 29, 2008, 19:45, and a success is returned as a response.

After the completion of uploading, the content in the network HDD 30 can be checked from the digital TV 20 by using a UPnP AV Browse command. This sequence and an example of details are the same as those in the first embodiment.

In the above sequence of operations in the upload sequence, even when a change in metadata is detected during uploading of a content item, the digital TV 20 can notify the network HDD 30 of metadata after the change at the timing of the detection. The network HDD 30 can hold metadata corresponding to a change in the details of the content to be uploaded on the basis of notified posterior metadata. Although the above operation can be implemented by a combination of commands defined by ContentDirectory:1, all network HDDs 30 are not necessarily equipped with the UpdateObject command. Furthermore, part of metadata does not allow any change by the UpdateObject command, but the digital TV 20 has no way of knowing this.

[Modification]

As described above, the network HDD 30 can properly get metadata by each of the methods disclosed in the first, second, and third embodiments even if metadata changes on the digital TV 20 side during uploading of a content item. However, each embodiment has its own problem, and hence the above three embodiments are preferably used in a proper combination thereof to solve these problems.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A content transmission apparatus comprising:
an acquisition module configured to acquire, from a content, metadata having a plurality of items explaining details of the content;
a notification module configured to notify a content reception apparatus, to which the content is to be uploaded, of the metadata acquired by the acquisition module via a network;
a transmission module configured to encode the content and to transmit, via the network, the encoded content as a body of an upload request based on an HTTP POST request to an entry point created by the content reception apparatus on the basis of the metadata, after notification of the metadata by the notification module;
a detection module configured to detect a change in metadata notified to the content reception apparatus from the notification module relative to metadata of the content transmitted, after notification of the metadata to the content reception apparatus; and
a re-notification module configured to notify the content reception apparatus of posterior metadata containing a changed item in the metadata, when the detection module detects the change in metadata;
the content transmission apparatus implemented as hardware.

2. The apparatus of claim 1, wherein the re-notification module is configured to attach the posterior metadata to an end of a content transmitted to the content reception apparatus.

3. The apparatus of claim 2, wherein the re-notification module is configured to store the posterior metadata in a posterior metadata header having a predetermined name, and the transmission module is configured to transmit an upload request which contains the name of the posterior metadata header as a value of a predetermined Trailer header and chunked-encodes the content to obtain a body.

4. The apparatus of claim 1, wherein the re-notification module is configured to notify the content reception apparatus of the posterior metadata every time the detection module detects a change in metadata.

5. The apparatus of claim 4, wherein the re-notification module is configured to notify the content reception apparatus of the posterior metadata by using an UpdateObject command defined by UPnP AV.

6. The apparatus of claim 1, wherein
the transmission module is configured to transmit identification information for querying about the posterior metadata to the content reception apparatus, and
the re-notification module is configured to notify posterior metadata containing at least a changed item in metadata in response to a query from the content reception apparatus when the detection module detects a change in metadata.

7. The apparatus of claim 6, wherein the identification information for querying about the metadata is a URL.

8. The apparatus of claim 7, wherein the URL is stored in a posterior metadata identification information header having a predetermined name and is transmitted as a header of the upload request.

9. A content reception apparatus comprising:
a store module configured to store, in a storage device, metadata outputted from a content transmission apparatus via a network;
a module configured to generate, on the basis of the outputted metadata, an entry point indicating a place where a content corresponding to the metadata is stored, and to notify the content transmission apparatus of the entry point via the network;
a reception module configured to receive a content encoded as a body of an upload request from the content transmission apparatus via the network;
a module configured to store the received content in a place corresponding to the entry point; and
an update module configured to update metadata stored in the storage device by using posterior metadata when receiving posterior metadata which is transmitted from the content transmission apparatus upon a detection of change in metadata related to the metadata stored in the storage device, wherein the posterior metadata contains at least a changed item in metadata stored in the storage device;
the content reception apparatus implemented as hardware.

10. The apparatus of claim 9, wherein the update module extracts posterior metadata attached to an end of a chunked-encoded content transmitted from the content transmission apparatus.

11. The apparatus of claim 9, wherein every time the posterior metadata sent during transmission of the content is acquired, the update module is configured to update metadata stored in the storage device by using the posterior metadata.

12. The apparatus of claim 9, further comprising a query module configured to query the content transmission apparatus of the metadata by using identification information, wherein the reception module is configured to receive the identification information for querying about the metadata, as a header of an upload request, which is transmitted from the content transmission apparatus.

13. The apparatus of claim 12, wherein the query module is configured to query about the posterior metadata by using an HTTP GET request.

14. The apparatus of claim 12, wherein the query module is configured to always query about the posterior metadata when reception of the content is finished.

15. A content upload method comprising:
transmitting by a content transmission apparatus a content item and metadata explaining details of the content item;
notifying by the content transmission apparatus a content reception apparatus of the metadata;
storing by the content reception apparatus, in a storage device, the metadata notified from the content transmission apparatus;

creating by the content reception apparatus, on the basis of the notified metadata, an entry point indicating a place where a content corresponding to the metadata is to be stored;

notifying by the content reception apparatus the content transmission apparatus of the entry point;

encoding by the content transmission apparatus the content and transmitting the encoded content as a body of an upload request to the entry point created by the content reception apparatus on the basis of the metadata;

receiving by the content reception apparatus the content as chunked-encoded content in the body of the upload request based on an HTTP POST request from the content transmission apparatus and storing the content in a place corresponding to the entry point;

detecting by the content transmission apparatus a change in metadata notified to the content reception apparatus relative to newly transmitted metadata;

notifying by the content transmission apparatus the content reception apparatus of posterior metadata containing at least a changed item in metadata when detecting the change in metadata; and updating by the content reception apparatus metadata in the storage device by using the posterior metadata.

16. The method of claim 15, wherein the content transmission apparatus attaches the posterior metadata to an end of a chunked-encoded content transmitted to the content reception apparatus.

17. The method of claim 15, wherein the content transmission apparatus notifies the content reception apparatus of a change in metadata every time a change in metadata is detected.

18. The method of claim 15, wherein
the content transmission apparatus transmits information for querying about the metadata as a header of the upload request to the content reception apparatus,
the content reception apparatus queries the content transmission apparatus of the metadata by using the information for querying, and
the content transmission apparatus notifies the content reception apparatus of the posterior metadata in response to the query when a change in the metadata is detected.

* * * * *